US011475159B2

(12) United States Patent
Yadav et al.

(10) Patent No.: US 11,475,159 B2
(45) Date of Patent: Oct. 18, 2022

(54) SYSTEM AND METHOD FOR EFFICIENT USER-LEVEL BASED DELETIONS OF BACKUP DATA

(71) Applicant: EMC IP Holding Company LLC, Hopkinton, MA (US)

(72) Inventors: Sunil Yadav, Bangalore (IN); Manish Sharma, Bangalore (IN); Aaditya Rakesh Bansal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 498 days.

(21) Appl. No.: 16/669,129

(22) Filed: Oct. 30, 2019

(65) Prior Publication Data

US 2021/0133354 A1    May 6, 2021

(51) Int. Cl.
*G06F 11/14*    (2006.01)
*G06F 21/62*    (2013.01)
*G06F 12/02*    (2006.01)

(52) U.S. Cl.
CPC ...... *G06F 21/6254* (2013.01); *G06F 11/1451* (2013.01); *G06F 12/0253* (2013.01); *G06F 2201/80* (2013.01)

(58) Field of Classification Search
CPC ............... G06F 11/14; G06F 11/1448; G06F 11/1435; G06F 11/1451; G06F 11/2094; G06F 21/6254
See application file for complete search history.

(56) References Cited

U.S. PATENT DOCUMENTS

| | | | |
|---|---|---|---|
| 6,408,336 B1 | 6/2002 | Schneider et al. | |
| 8,554,918 B1 | 10/2013 | Douglis | |
| 8,812,455 B1 | 8/2014 | Claudatos et al. | |
| 9,298,707 B1 | 3/2016 | Zhang et al. | |
| 9,430,332 B1 | 8/2016 | Bahadure | |
| 9,772,791 B2 | 9/2017 | Resch | |
| 9,977,704 B1 | 5/2018 | Chopra et al. | |
| 10,102,083 B1 | 10/2018 | Dobrean et al. | |
| 10,320,757 B1 | 6/2019 | Secker-walker | |
| 10,417,213 B1 | 9/2019 | Mukku et al. | |
| 10,489,066 B1 * | 11/2019 | Krinke | G06F 3/0619 |
| 10,572,350 B1 * | 2/2020 | Bansal | G06F 11/1484 |
| 10,642,698 B1 * | 5/2020 | Chopra | G06F 11/1464 |
| 11,265,148 B1 * | 3/2022 | Griffin | H04L 9/0643 |
| 11,297,459 B2 | 4/2022 | Raduchel et al. | |
| 2008/0086609 A1 | 4/2008 | Lesser et al. | |
| 2010/0058114 A1 * | 3/2010 | Perkins | G06Q 10/06 714/39 |
| 2010/0250497 A1 | 9/2010 | Redlich et al. | |

(Continued)

*Primary Examiner* — Kamini B Patel
(74) *Attorney, Agent, or Firm* — Chamberlain, Hrdlicka, White, Williams & Aughtry

(57) ABSTRACT

A backup storage for providing backup services includes storage and a compliance manager. The storage includes backups. The compliance manager obtains a compliance request for data; makes a determination, in response to obtaining the compliance request, that the data is stored as part of a backup of the backups; in response to making the determination: deletes linking data that associates a portion of a compliance sensitive data portion stored in backup metadata of the backup with a portion of modified backup data of the backup to make the linking data unavailable; and removes the modified backup data using garbage collection.

20 Claims, 12 Drawing Sheets

(56) References Cited

U.S. PATENT DOCUMENTS

| | | |
|---|---|---|
| 2011/0113012 A1 | 5/2011 | Gruhl et al. |
| 2011/0131185 A1 | 6/2011 | Kirshenbaum |
| 2011/0213928 A1 | 9/2011 | Grube et al. |
| 2013/0091536 A1 | 4/2013 | Manjunath |
| 2014/0115029 A1 | 4/2014 | Baldwin et al. |
| 2014/0136832 A1 | 5/2014 | Klum et al. |
| 2014/0310800 A1 | 10/2014 | Kabra et al. |
| 2014/0351632 A1 | 11/2014 | Grube et al. |
| 2015/0046192 A1 | 2/2015 | Raduchel |
| 2015/0066865 A1 | 3/2015 | Yara |
| 2015/0066866 A1 | 3/2015 | Yara |
| 2015/0169898 A1 | 6/2015 | Lembcke |
| 2015/0242648 A1 | 8/2015 | Lemmey |
| 2016/0034133 A1 | 2/2016 | Wilson et al. |
| 2016/0132521 A1 | 5/2016 | Reininger |
| 2016/0179416 A1 | 6/2016 | Mutha et al. |
| 2016/0274978 A1 | 9/2016 | Strohmenger et al. |
| 2016/0357971 A1 | 12/2016 | Sinha et al. |
| 2016/0371500 A1 | 12/2016 | Huang et al. |
| 2017/0371547 A1 | 12/2017 | Fruchtman et al. |
| 2018/0032446 A1 | 2/2018 | Amarendran et al. |
| 2018/0067848 A1 | 3/2018 | Baldwin |
| 2018/0089044 A1 | 3/2018 | Guim Bernat et al. |
| 2018/0157860 A1 | 6/2018 | Nair et al. |
| 2018/0159729 A1 | 6/2018 | Deshmukh et al. |
| 2018/0225177 A1 | 8/2018 | Bhagi et al. |
| 2018/0232528 A1 | 8/2018 | Williamson et al. |
| 2019/0057101 A1* | 2/2019 | Esserlieu .............. G06F 3/0604 |
| 2019/0158596 A1 | 5/2019 | Mcshane et al. |
| 2019/0205056 A1 | 7/2019 | Halstuch |
| 2019/0312910 A1 | 10/2019 | Convertino et al. |
| 2019/0332683 A1 | 10/2019 | Thummala et al. |
| 2019/0354708 A1 | 11/2019 | Fisher et al. |
| 2020/0012431 A1* | 1/2020 | Chopra ............... G06F 11/1461 |
| 2020/0233975 A1* | 7/2020 | Rosenthol ........... G06Q 20/385 |
| 2020/0241908 A1 | 7/2020 | Dornemann et al. |
| 2020/0241975 A1* | 7/2020 | Basham .............. G06F 11/1415 |
| 2020/0285771 A1* | 9/2020 | Dey .................... G06F 21/6272 |
| 2020/0302082 A1 | 9/2020 | Carteri et al. |
| 2020/0320208 A1 | 10/2020 | Bhosale et al. |
| 2021/0034571 A1 | 2/2021 | Bedadala et al. |
| 2021/0035089 A1 | 2/2021 | Johnston |
| 2021/0117277 A1* | 4/2021 | Shetty ................. G06F 11/1466 |
| 2021/0133040 A1 | 5/2021 | Bansal et al. |
| 2021/0133248 A1 | 5/2021 | Sharma et al. |

\* cited by examiner

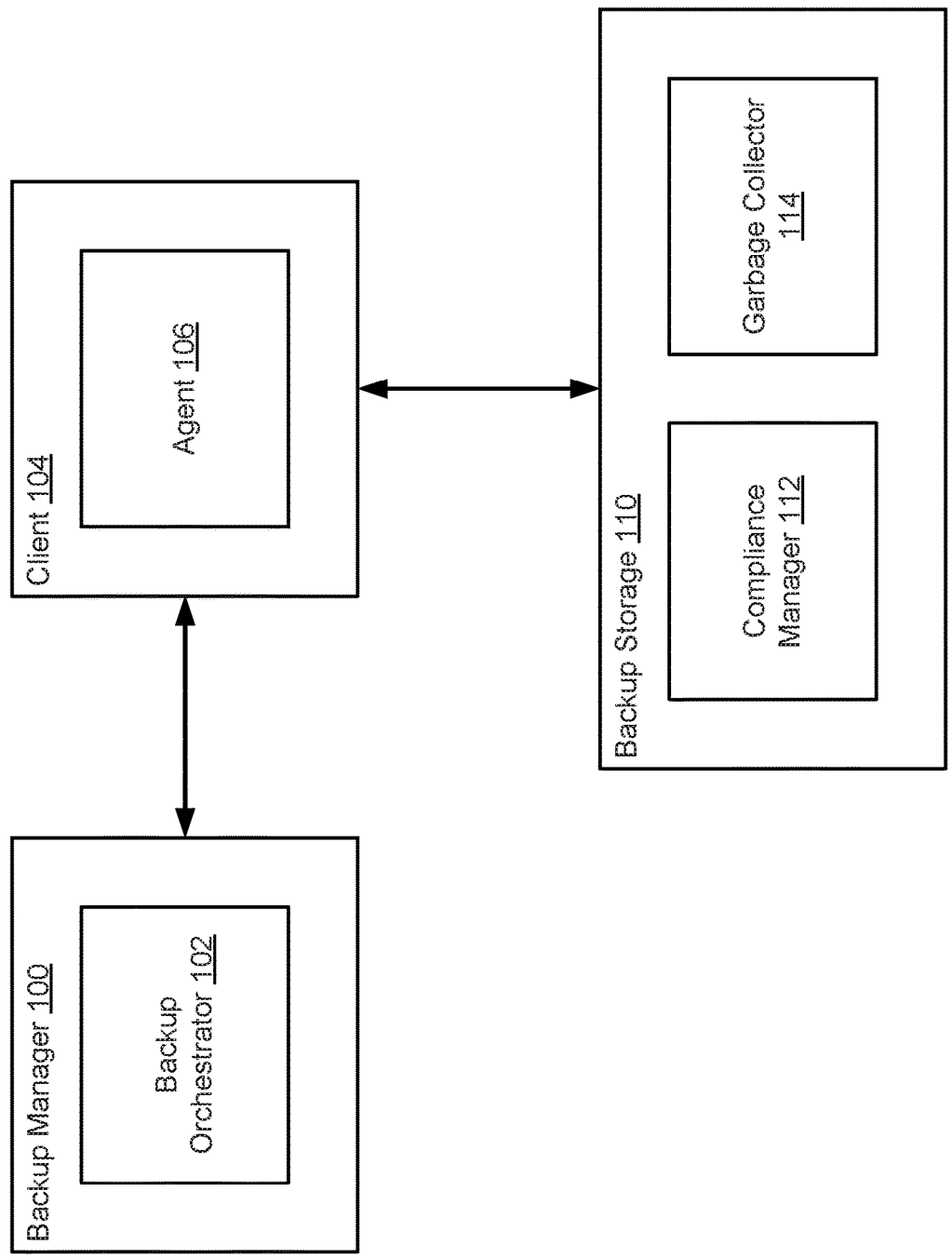
FIG. 1.1

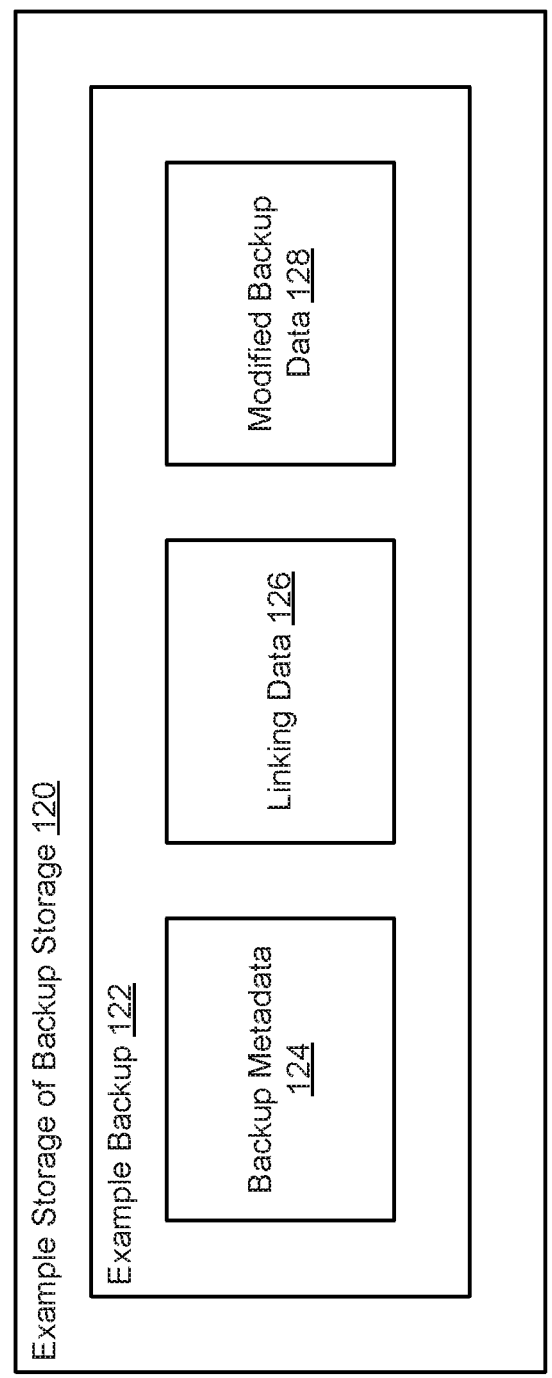
FIG. 1.2

Example Backup Data 130

| Metadata Portion 134 | Data Portion 136 | Metadata Portion 138 | Compliance Sensitive Data Portion 140 |

FIG. 1.3

Example Modified Backup Data 141

| Metadata Portion 142 | Data Portion 144 | Metadata Portion 146 | Reference 148 |

FIG. 1.4

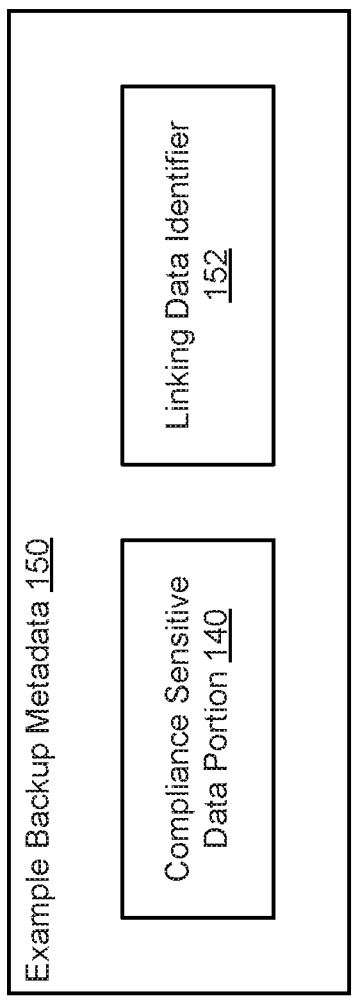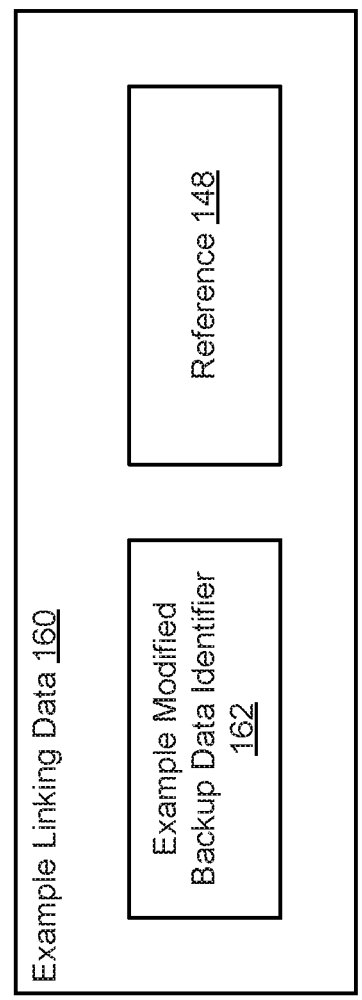

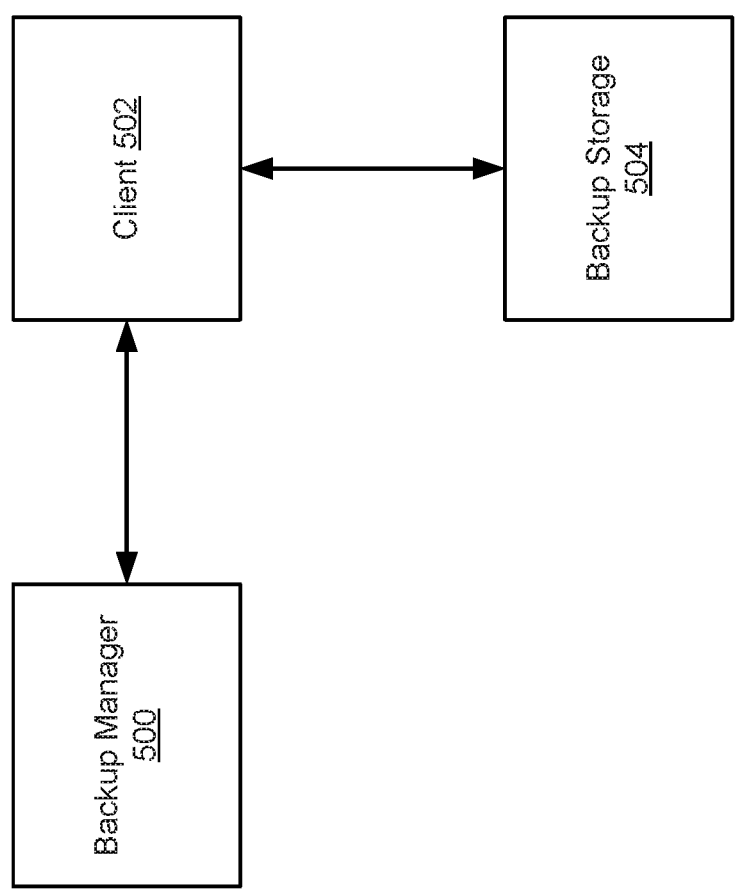
FIG. 5.1

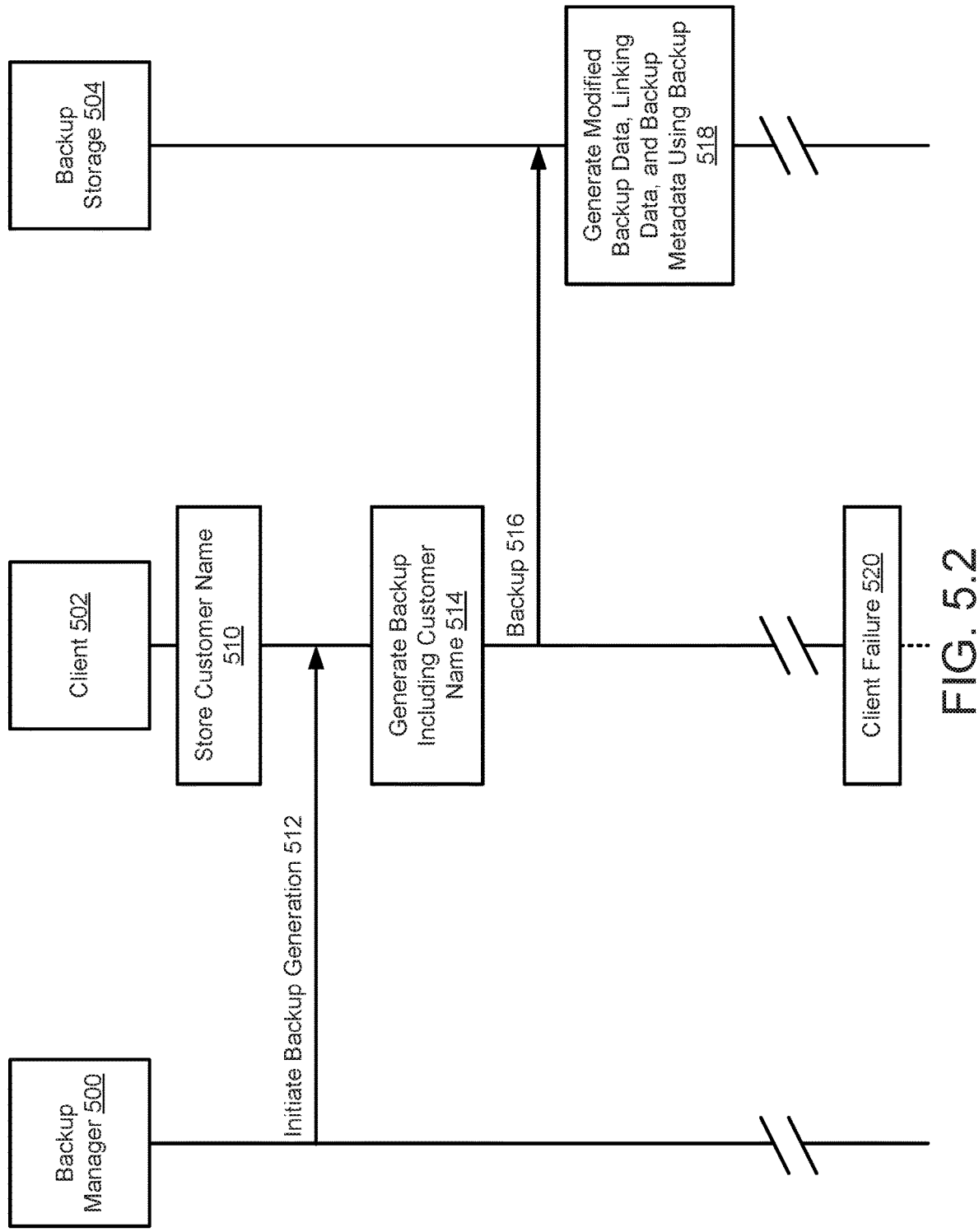

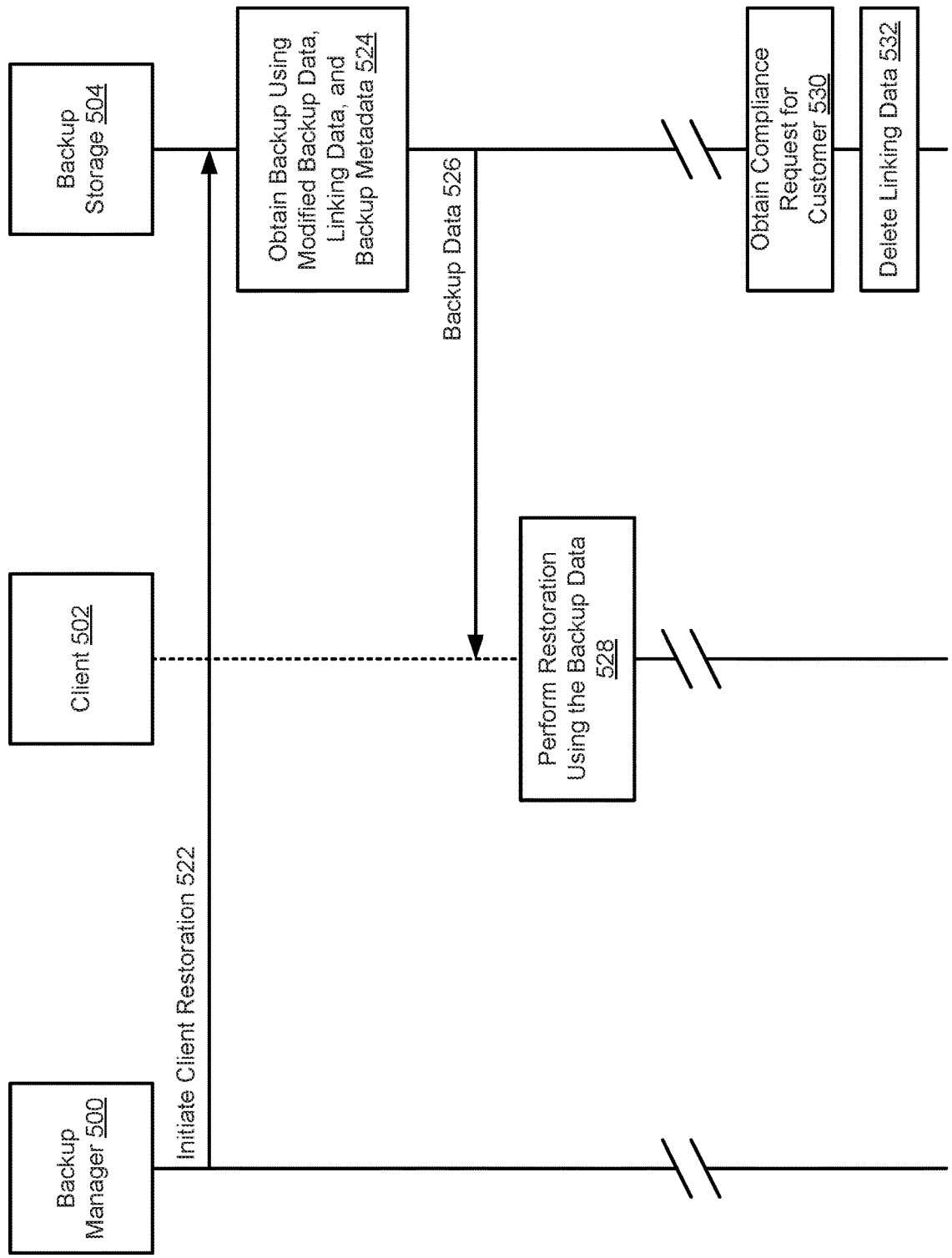
FIG. 5.3

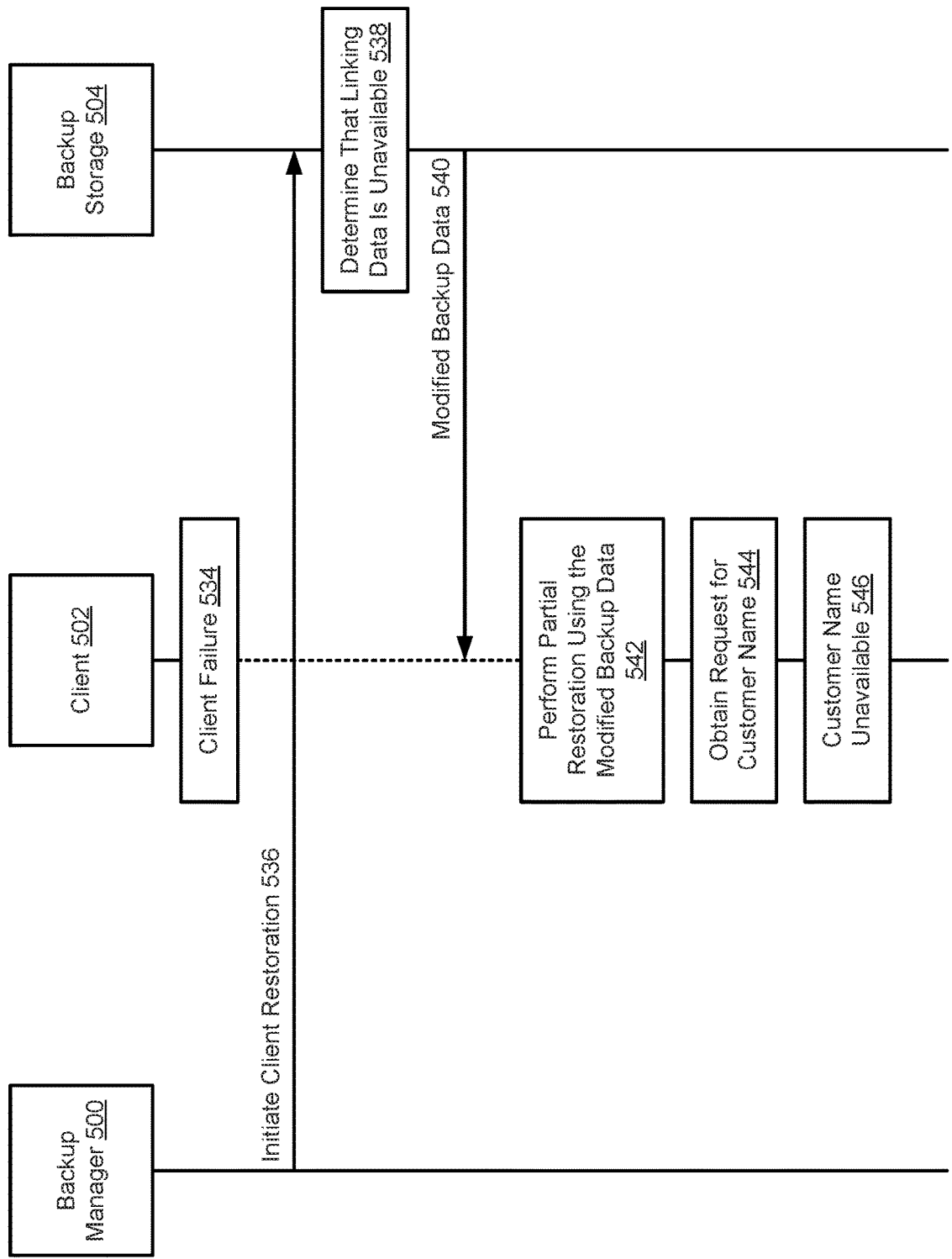
FIG. 5.4

SYSTEM AND METHOD FOR EFFICIENT USER-LEVEL BASED DELETIONS OF BACKUP DATA

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a backup storage for providing backup services in accordance with one or more embodiments of the invention includes storage and a compliance manager. The storage includes backups. The compliance manager obtains a compliance request for data; makes a determination, in response to obtaining the compliance request, that the data is stored as part of a backup of the backups; in response to making the determination: deletes linking data that associates a portion of a compliance sensitive data portion stored in backup metadata of the backup with a portion of modified backup data of the backup to make the linking data unavailable; and removes the modified backup data using garbage collection.

In one aspect, a method for providing backup services in accordance with one or more embodiments of the invention includes obtaining a compliance request for data; making a determination, in response to obtaining the compliance request, that the data is stored as part of a backup; in response to making the determination: deleting linking data that associates a portion of compliance sensitive data portion stored in backup metadata of the backup with a portion of modified backup data of the backup to make the linking data unavailable; and removing the modified backup data using garbage collection.

In one aspect, a non-transitory computer readable medium in accordance with one or more embodiments of the invention includes computer readable program code, which when executed by a computer processor enables the computer processor to perform a method for providing backup services. The method includes obtaining a compliance request for data; making a determination, in response to obtaining the compliance request, that the data is stored as part of a backup; in response to making the determination: deleting linking data that associates a portion of compliance sensitive data portion stored in backup metadata of the backup with a portion of modified backup data of the backup to make the linking data unavailable; and removing the modified backup data using garbage collection.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example storage of a backup storage in accordance with one or more embodiments of the invention.

FIG. 1.3 shows a diagram of an example of backup data in accordance with one or more embodiments of the invention.

FIG. 1.4 shows a diagram of an example of modified backup data in accordance with one or more embodiments of the invention.

FIG. 1.5 shows a diagram of an example of backup metadata in accordance with one or more embodiments of the invention.

FIG. 1.6 shows a diagram of an example of linking data in accordance with one or more embodiments of the invention.

FIG. 5.1 shows a diagram of an example system.

FIGS. 5.2-5.4 show diagrams of interactions between and actions performed by components of the example system of FIG. 5.1 over time.

DETAILED DESCRIPTION

Figure 2:
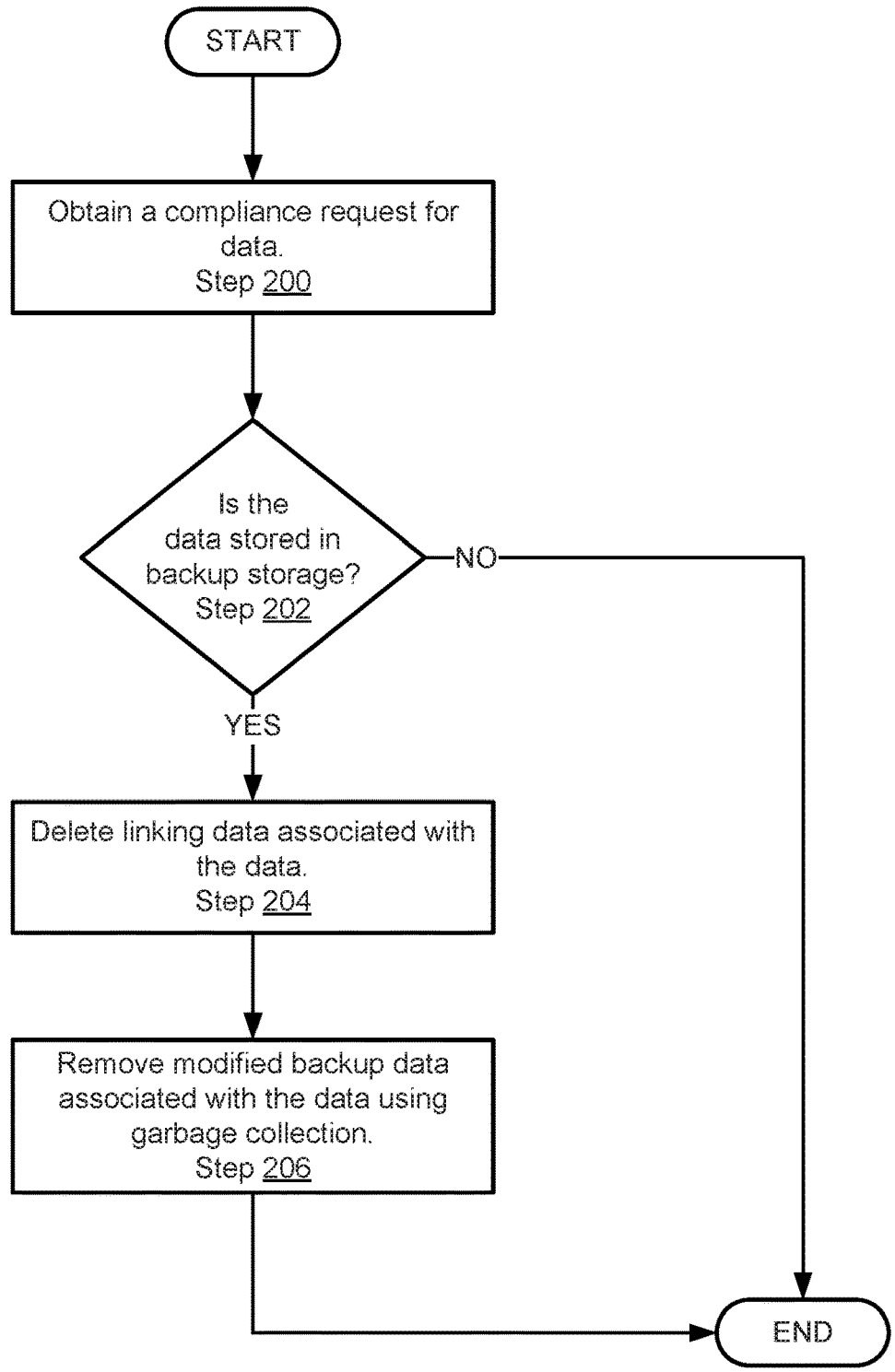
FIG. 2 shows a flowchart of a method of servicing a compliance request in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

In general, embodiments of the invention relate to systems, devices, and methods for providing backup services to clients and/or other types of devices. Backup services may include generating backups of the clients, storing the backups, using the backups to restore clients to previous states, and/or ensuring that the system complies with regulations governing storage of data.

Depending on a location of a particular component of a system, the particular component may be subject to governmental regulations regarding the storage of different types of information. For example, in Europe the General Data Protection Regulation (GDPR) limits the ability of personal information to be stored.

When backups of entities are generated, the backups may include data subject to the GDPR or other types of regulations. Embodiments of the invention may provide a method of storing the backups in a manner that facilitates compliance with data regulations in a manner that is less likely to impact the ability of the system to provide its other services.

For example, when backups are stored, the backups may be deduplicated, encrypted, or otherwise stored in a manner that makes deleting of portions of the backups computationally expensive processes. However, to comply with data regulations, portions of the backups may need to be deleted quickly. Consequently, actual deletion of bit sequences corresponding to data subject to data regulations may negatively impact the ability of the system to provide other functionality due to limitations with respect to the availability of computing resources.

Embodiments of the invention may provide a method that separately stores data subject to data regulations and metadata that describes the data. Associations between the data and the metadata may be separately stored from the data and the metadata. By doing so, the system may enable data regulations to be complied with by deleting the associations between the data and the metadata which may render the data subject to the data regulations to be (i) inaccessible and/or (ii) uninterpretable (because the metadata used to interpret/describe the contents of the data may be rendered unavailable by deletion of the associations). Accordingly, by deleting of the associations, the data subject to the data regulations may be logically deleted (e.g., rendered inaccessible and/or uninterpretable) at little computational cost.

Embodiments of the invention may further provide a system that removes or otherwise renders inaccessible bit sequences corresponding to logically deleted data and/or metadata at points in time during which such removals are unlikely to impact the ability of the system to provide other services. For example, the system may utilize garbage collection or other computational resource sensitive methods of performing computationally expensive deletions to remove the bit sequences. By doing so, the system may actually remove the logically deleted metadata and/or metadata at points in time that are unlikely to negatively impact the ability of the system to provide other services.

Consequently, a system in accordance with embodiments of the invention may provide an improved user experience by reducing the likelihood of the occurrence of phantom slowdowns (e.g., slowdowns that appear to a user of a system to not be due to the user). For example, by shifting in time the computational expensive of performing actual deletions of bit sequences corresponding to data subject to data regulations, a system in accordance with embodiments of the invention may perform such deletions during period of high computing resource availability. Accordingly, by virtue of the high availability of computing resources, phantom slowdowns or other performance related issues may be avoided.

FIG. 1.1 shows a system in accordance with one or more embodiments of the invention. The system may include a client (104) that utilizes backup services provided by the backup manager (100), an agent hosted by the client (104), and/or a backup storage (110). The backup services may include (i) generation of backups of the client (104), (ii) storing the backups and/or other data in a backup storage (110), (iii) identifying portions of the backups and/or other data stored in backup storage that includes compliance sensitive information, and/or (iv) modifying the manner in which the backups and/or other data are stored to enable the system to ensure that data stored in backup storage (110) complies with various regulations (e.g., ensuring that compliance sensitive information complies with jurisdictional regulations such as the general data protection regulation (GDPR) in Europe).

For example, backups of the client (104) may be data structures that include data reflecting the state of the client (104) at a point of time (e.g., a full backup) and/or changes in the state of the client (104) over a period of time (e.g., an incremental backup). Different portions of the backup may correspond with different portions of the client's (104) data (e.g., files if a file system is used to organize the client's data or other types of data structures that may be employed by other types of data organization systems) at the point/period of time. Accordingly, any number of portions of the backup may include compliance sensitive information as, for example, personal information that may be protected or otherwise regulated by the GDPR or other data protection regulations enacted in any number of jurisdictions.

The backups may be used to change the data of the client (104) to reflect the data at periods of time associated with backups. Once changed, the state of the client (104) may be similar to the state of the deployment when the backups were generated. Consequently, if compliance sensitive data is stored as part of a backup in backup storage, modifying the data of the client (104) may result in compliance sensitive information being stored in the client (104) and/or other entities for which backups may be used to restore copies of locally stored data.

Thus, when backups are used to restore the operational state of the client (104) to previous operational states, failures to ensure compliance with data protection regulations with respect to backups used to perform restorations may cause the failures of compliance to be propagated to the client (104) and/or other entities.

For example, consider a scenario in which the client (104) is hosted by a computing device that suffers a catastrophic hardware failure. The aforementioned restoration functionality may be desirable, for example, to respond to the hardware failure by utilizing stored backups for the client to instantiate a new instance of the client (104) that is hosted by a different computing device. However, if the backups used to perform the restoration include noncompliant compliance sensitive data, the resulting instance of the client (104) may also include noncompliant compliance sensitive data.

Embodiments of the invention may provide a method and/or system for facilitate compliance with respect to jurisdictional regulations of compliance sensitive data stored in backup storage (110). To do so, a system in accordance with embodiments of the invention may identify compliance sensitive information stored as part of backups (e.g., as part of backup data of a backup) and modify the backups based on the identified compliance sensitive information to enable compliance with jurisdictional regulations (e.g., removing personal information upon request) in a manner that does not impair the ability of the system to provide its functionality.

For example, compliance with jurisdictional regulations may be a computationally expensive task. Consequently, consumption of computing resource for complying with jurisdictional regulations may impair the ability of a system to provide its other functionalities. Accordingly, a user experience may be degraded due to, for example, phantom slowdowns (e.g., slowdowns for which users are unable to identify a cause) of the other services provided by the system due to consumption of computing resources for compliance with jurisdictional requirements.

Each of the components of the system of FIG. 1.1 may be operably connected to each other and/or other entities not shown in FIG. 1.1 using any combination and quantity of wired and/or wireless networks. Each component of the system of FIG. 1.1 is discussed below.

The client (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-4. The client (104) may be implemented using other types of computing devices without departing from the invention. For additional details regarding computing devices, refer to FIG. 6.

The client (104) may be implemented using logical devices without departing from the invention. For example, the client (104) may be implemented using virtual machines that utilize computing resources of any number of physical computing devices to provide the functionality of the client (104). The client (104) may be implemented using other types of logical devices without departing from the invention.

In one or more embodiments of the invention, the client (104) provides computer implemented services. A computer implemented service may be, for example, managing a database, serving files, and/or providing other types of services that may be utilized by users. The computing implemented services may be other types of services without departing from the invention.

When providing computer implemented services, the client (104) may generate and store data which the client (104) utilizes to provide the computer implemented services. For example, to provide database services, the client (104) may store information from a user in a database. The user may desire access to the information in the future. Consequently, the future availability of the data stored in the data may be valuable to the client (104).

Similarly, other entities may desire access to all, or a portion, of the client's data at future points in time. For example, other entities may desire to obtain access to information included in a database hosted by the client (104).

To improve the likelihood that such data is available in the future, the client (104) may utilize backup services provided by the backup manager (100). As discussed above, the backup services provided by the backup manager (100) may include orchestration of backup generation, storage of backups in the backup storage (110), and/or providing access to backups and/or information included in the backups (e.g., particular files).

To assist the backup manager (100) in providing backup services, the client (104) may host an agent (106). The agent (106) may orchestrate generation of backups of the client (104). To do so, the agent (106) may invoke functionality of the client (104) to generate the backup. For example, the agent (106) may invoke the functionality of the client (104) to cause the client (104) to enter a consistent state (e.g., flush buffers or other in-memory data structures) and generate a backup of all, or a portion, of the client data.

The agent (106) may identify portions of the backup that include data that may be subject to jurisdictional requirements. To do so, the agent (106) may perform data mining, pattern matching, and/or any other type of algorithm for identifying portions of the back of the client (104) that include data subject to jurisdictional requirement. The identifications of portions of the data that are subject to jurisdictional requirements (e.g., compliance sensitive data) may be used to modify the storage of the backups, as will be discussed in greater detail below.

The compliance sensitive information identification functionality of the agent (106) may be performed by other entities such as, for example, the backup storage (110), the backup manager (100), or another entity not illustrated in FIG. 1.1 without departing from the invention.

The agent (106) may be implemented using a logical entity. For example, the agent (106) may be implemented using computer instruction stored in persistent storage that when executed by a processor of the client gives rise to the agent (106). The agent (106) may be implemented using a physical device. For example, the agent (106) may be implemented using an integrated circuit having circuitry adapted to provide the functionality of the agent (106). The circuitry may be adapted to provide the functionality of the agent (106) by including different portions of circuitry that provide different portions of the functionality of the agent (106).

Figure 3:
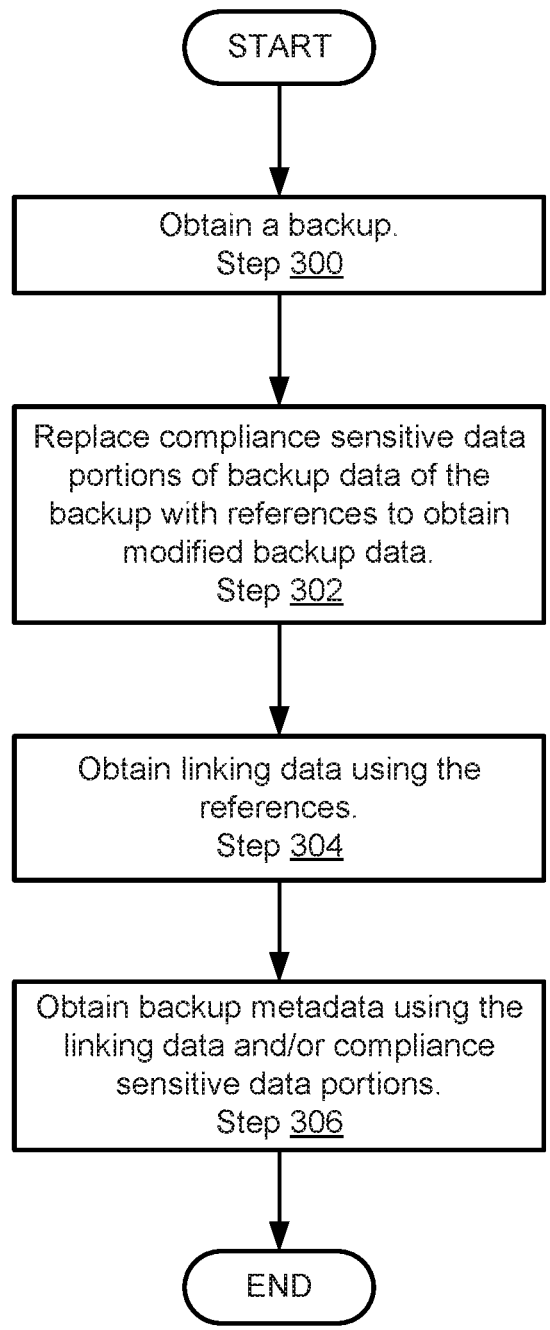
FIG. 3 shows a flowchart of a first method of providing backup services in accordance with one or more embodiments of the invention.
Figure 4:
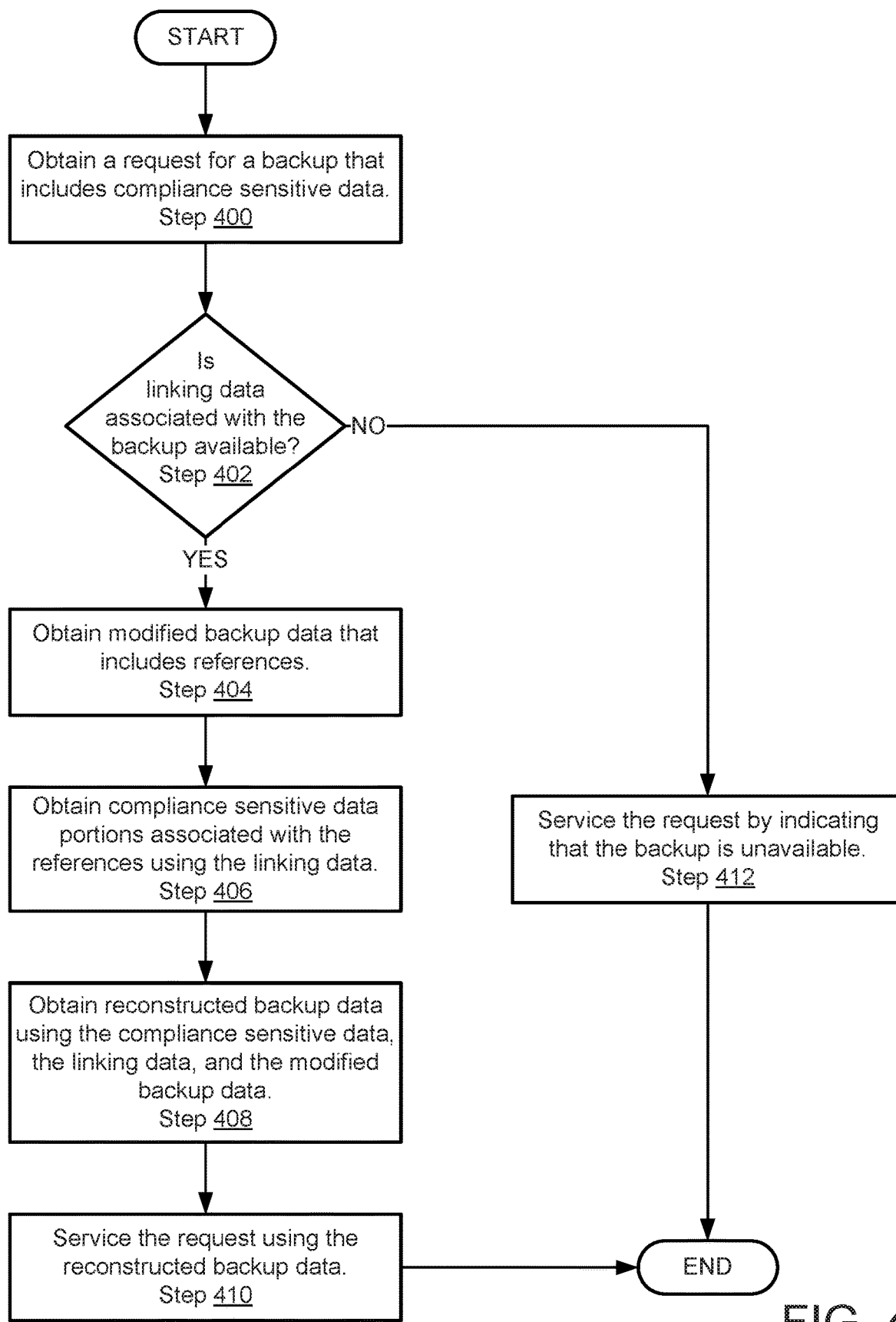
FIG. 4 shows a flowchart of a second method of providing backup services in accordance with one or more embodiments of the invention.

When providing its functionality, the agent (106) may perform all, or a portion, of the methods illustrated in FIGS. 2-4.

While the client (104) is illustrated in FIG. 1.1 as including an agent (106), the client (104) may include additional, fewer, and/or different components from those discussed above without departing from the invention.

The backup manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-4. The backup manager (100) may be implemented using other types of computing devices without departing from the invention. For additional details regarding computing devices, refer to FIG. 6.

The backup manager (100) may be implemented using logical devices without departing from the invention. For example, the backup manager (100) may be implemented using virtual machines that utilize computing resources of any number of physical computing devices to provide the functionality of the backup manager (100). The backup manager (100) may be implemented using other types of logical devices without departing from the invention.

In one or more embodiments of the invention, the backup manager (100) provides backup services to the client (104) and/or other entities. Providing backup services may include orchestrating (i) generation of backups of the client (104), (ii) orchestrating storage of the backups in the backup storage (110), (iii) searching backups stored in the backup storage (110) for portions of data (e.g., particular files), (iv) providing data from the backups stored in the backup storage (110), and/or (iv) orchestrating modification of the manner in which backups are stored to facilitate computationally efficient compliance with jurisdictional requirements.

To provide its functionality, the backup manager (100) may include a backup orchestrator (102) that provides the above noted functionality of the backup manager (100) and/or includes functionality to send messages to entities (e.g., an agent (106)) hosted by the client (104) to invoke functionality of the entities (e.g., agent (106)). For example, the agent (106) hosted by the client (104) may service requests from the backup manager (100). The agent (106) may, upon receipt of such requests, invoke functionality of the client (104) and/or its own functionality to service the requests from the backup manager (100).

The backup storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-4. The backup storage (110) may be implemented using other types of computing devices without departing from the invention. For additional details regarding computing devices, refer to FIG. 6.

The backup storage (110) may be implemented using logical devices without departing from the invention. For example, the backup storage (110) may be implemented using virtual machines that utilize computing resources of any number of physical computing devices to provide the functionality of the backup storage (110). The backup storage (110) may be implemented using other types of logical devices without departing from the invention.

In one or more embodiments of the invention, the backup storage (110) provides data storage services to the client (104) and/or other entities. Data storage services may include (i) storing data such as, for example, backups in a manner that facilitates compliance with jurisdictional requirements, (ii) providing copies of previously stored data, and (iii) servicing requests with respect to jurisdictional requirements such as, for example, requests to delete personal information.

For example, if a personal desires to have personal information removed from the system of FIG. 1, the client may send a compliance request to the system. To service the request, the backup storage (110) may modify stored data to comply with the compliance request.

To provide its functionality, the backup storage (110) may include a compliance manager (112) and/or a garbage collector (114). Each of the components of the backup storage (110) is discussed below.

The compliance manager (112) may (i) modify and/or store backups in a manner as will be discussed with respect to FIGS. 1.3-1.6 and/or (ii) service compliance requests. By storing backups and/or other types of data as discussed below, the computational cost and/or computational load for servicing compliance requests may be reduced and/or shifted in time to enable the backup storage (110) to provide its other functionalities without being impacted by servicing of compliance requests.

To service compliance requests, the compliance manager (112) may remove a portion of the backup or other data that renders data for which the compliance request was sent to be inaccessible. However, while the data may be inaccessible (e.g., logically deleted), the bit patterns corresponding to the data may still be stored in backup storage (110). As will be discussed below, the garbage collector (114) may remove the bit patterns corresponding to the data in a manner that does not negatively impact the ability of the backup storage (110) to provide its other functionalities.

The compliance manager (112) may be implemented using a logical entity. For example, the compliance manager (112) may be implemented using computer instruction stored in persistent storage that when executed by a processor of the client gives rise to the compliance manager (112). The compliance manager (112) may be implemented using a physical device. For example, the compliance manager (112) may be implemented using an integrated circuit having circuitry adapted to provide the functionality of the compliance manager (112). The circuitry may be adapted to provide the functionality of the compliance manager (112) by including different portions of circuitry that provide different portions of the functionality of the compliance manager (112).

When providing its functionality, the compliance manager (112) may perform all, or a portion, of the methods illustrated in FIGS. 2-4.

The garbage collector (114) may remove bit patterns for which compliance requests have been serviced. As will be discussed below with respect to FIGS. 1.3-1.6, when a compliance request is serviced, linking data associated with data that is subject to a compliance request may be removed. Doing so may render the data to be inaccessible or otherwise unrecoverable from the backup storage (110). However, the bit patterns corresponding to the data may still be stored in the backup storage (110) after the compliance request is serviced.

To remove the bit patterns corresponding to the data, the garbage collector (114) may, when computing resources of the backup storage (110) are in a high availability state, remove such bit patterns. The garbage collector (114) may do so by identifying portions of data that are stored in the backup storage (110) that are not associated with any linking data (e.g., an orphaned portion of data). The orphaned portions of data may be removed (e.g., overwritten or otherwise modified to render the data to be lost) by the garbage collector (114) as computational resources of the backup storage (110) allow for the removal without impacting other services provided by the backup storage.

The garbage collector (114) may be implemented using a logical entity. For example, the garbage collector (114) may be implemented using computer instruction stored in persistent storage that when executed by a processor of the client gives rise to the garbage collector (114). The garbage collector (114) may be implemented using a physical device. For example, the garbage collector (114) may be implemented using an integrated circuit having circuitry adapted to provide the functionality of the garbage collector (114). The circuitry may be adapted to provide the functionality of the garbage collector (114) by including different portions of circuitry that provide different portions of the functionality of the garbage collector (114).

When providing its functionality, the garbage collector (114) may perform all, or a portion, of the methods illustrated in FIGS. 2-4.

While the system of FIG. 1.1 has been illustrated as including a limited number of specific components, a system in accordance with embodiments of the invention may include additional, fewer, and/or different components without departing from the invention. For example, the system may include any number of clients (e.g., 104), backup managers (e.g., 100) that provide backup services to all or a portion of the clients, backup storages (110) that provide backup services to any number of entities, and/or other entities without departing from the invention. Any of the aforementioned components may cooperate to provide the above noted and later described functionality of the system of FIG. 1.1.

As discussed above, the backup storage (110) may store data such as backups. To further clarify aspects of data stored by the backup storage (110), a diagram of an example storage of the backup storage (120) is illustrated in FIG. 1.2.

Turning to FIG. 1.2, FIG. 1.2 shows a diagram of an example storage of the backup storage (120) in accordance with embodiments of the invention.

In one or more embodiments of the invention, the example storage of the backup storage (120) is implemented using devices that provide data storage services (e.g., storing data and providing copies of previously stored data). The devices that provide data storage services may include hardware devices and/or logical devices. For example, the example storage of the backup storage (120) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the example storage of the backup storage (120) may include a memory device (e.g., a dual in line memory device) in which data is stored and from which copies of previously stored data are provided. In another example, the example storage of the backup storage (120) may include a persistent storage device (e.g., a solid state disk drive) in which data is stored and from which copies of previously stored data is provided. In a still further example, the example storage of the backup storage (120) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example storage of the backup storage (120) may store data structures including an example backup (122). The example backup (122) may be a data structure that includes information regarding the state of the client (104, FIG. 1.1) at a point in time, changes to the state of the client (104, FIG. 1.1) over a period of time, and/or other types of information reflecting the state of the client. The example backup (122) may be usable, in isolation or in combination with other backups, to restore a state of the client (104, FIG. 1.1) to a previous state associated with the example backup (122) and/or other backups.

For example, a backup that reflects the state of the client (104, FIG. 1.1) at a point in time may include a copy of all, or a portion, of the client's data at a point in time (e.g., a full backup). Such a backup may be implemented as, for example, an image of the client (or a portion of the client).

In another example, a backup that reflects changes to the state of the client (104, FIG. 1.1) over a period of time may include changes made to all, or a portion, of the client's data over the period of time. Such a backup may be implemented as, for example, a list of modifications to all of the client's data (e.g., an incremental backup) or a list of modifications to a particular portion of the client's data (e.g., a transaction log from an application hosted by the client). Backups that reflect changes to the state of the client over a period of time may be used in combination with at least one other backup that reflects the state of the client at a point in time (e.g., the state of the client at a point in time in combination with changes to the state of the client over a period of time may be used to derive the state of the client at a second point in time). Multiple backups that reflect changes to the state of the client over multiple periods of time may be used in combination (e.g., chaining) to derive the state of the client at any number of different points in time.

The example backup (122) may include backup metadata (124), linking data (126), and modified backup data (128). Each of these components of the example backup (122) is discussed below.

The backup metadata (124) may include information regarding (i) the organizational layout of the example backup (122) and/or (ii) data that is potentially subject to compliance requests. The data that is potentially subject to compliance requests may include, for example, personal information. The data that is potentially subject to compliance requests may include other types of information without departing from the invention.

The data that is potentially subject to compliance requests may include data removed from backup data. The backup data may be generated by a client. The backup data may, when generated, include data that is potentially subject to compliance. The compliance manager or the client may remove the data that is potentially subject to compliance requests from the backup data resulting in the generation of modified backup data (128). The removed data that is potentially subject to compliance requests may be stored as part of the backup metadata (124).

When data that is potentially subject to compliance requests is stored in backup metadata (124), the data may be associated with linking data (126). Linking data (126) may associate portions of data of the backup metadata (124) with corresponding portions of modified backup data (128). For example, when data is removed from backup data, the removed data may be replaced with a reference. A copy of the reference may be stored in linking data (126). By doing so, the linking data (126) may be associated with a specific portion of the modified backup data (128).

Thus, when data is removed from backup data, the data may be stored as a part of backup metadata associated with the resulting modified backup data (128). Because the backup metadata (124) may include any number of portions of data removed from backup data, the data included in the backup metadata (124) may not be interpretable in isolation or in combination with the modified backup data (128). Rather, the data included in the metadata (124) may only be usable in combination with the modified backup data (128) when corresponding linking data (126) is available. The linking data (126) may specify which portion of the data of the backup metadata (124) is to be used to replace a corresponding reference of modified backup data (128). When such replacements are made, a copy of the backup data (as originally generated by a client) may be obtained (e.g., generated/regenerated). However, if the linking data (126) is unavailable, the backup metadata (124) and the modified backup data (128) may not be used in isolation or combination to obtain the backup data as generated by the client. Consequently, the presence of the backup metadata (124) and/or the modified backup data (128) may in the example storage of the backup storage (120) may not prevent the backup storage from complying with jurisdictional requirements regarding data storage.

To further clarify the content of backups (e.g., 122), diagrams of an example of backup data (130), an example of modified backup data (141), an example of backup metadata (150), and an example of linking data (160) are illustrated in FIGS. 1.3-1.5, respectively.

FIG. 1.3 shows a diagram of example backup data (130) in accordance with one or more embodiments of the invention. The example backup data (130) may be generated by a client. For example, the example backup data (130) may be an image of the client or another type of data structure that reflect all, or a portion, of the state of the client and/or changes to the state of the client.

The example backup data (130) may include metadata portions (e.g., 134, 138) and data portions (e.g., 136, 140). At least one of the data portions may be a compliance sensitive data portion (140). In other words, the compliance sensitive data portion (140) may include, for example, personal information that may be subject to jurisdictional requirements regarding data storage.

FIG. 1.4 shows a diagram of an example of modified backup data (141) in accordance with one or more embodiments of the invention. As discussed above, modified backup data may be generated by removing compliance sensitive data from backup data and replacing the removed portions of data with references (e.g., 148). Consequently, the example modified backup data (141) may include any number of metadata portions (e.g., 142, 146), any number of data portions (e.g., 144), and at least one reference (e.g., 148) which has replaced a compliance sensitive data portion (e.g., 140, FIG. 1.3).

FIG. 1.5 shows a diagram of an example of example backup metadata (150) in accordance with one or more embodiments of the invention. As discussed above, the example backup metadata (150) may include layout information for various portions of a backup, any number of portions of compliance sensitive data portions (e.g., 140) that were removed from backup data when generating modified backup data, and information that enables a relationship between the compliance sensitive data portion (140) and corresponding linking data to be identified. For example, the example backup metadata (150) may include a linking data identifier (152) associated with one or more portions of compliance sensitive data portions (e.g., 140). The linking data identifier (152) may include, for example, an identifier of linking data (e.g., refer to FIG. 1.6).

FIG. 1.6 shows a diagram of an example of linking data (160) in accordance with one or more embodiments of the invention. The example linking data (160) may associate one or more compliance sensitive data portions stored in backup metadata with portions of modified backup data.

For example, the example linking data (160) may include an example modified backup data identifier (162) and a reference (148). The example modified backup data identifier (162) may include an identifier of modified backup data. The reference (148) may specify a reference stored in the modified backup data identified by the example modified backup data identifier (162).

The data structures illustrated in FIG. 1.4-1.6 may be utilized to (i) render compliance sensitive data to be inaccessible and/or (ii) regenerate backup data. To render the compliance sensitive data to be inaccessible, linking data (e.g., 160) that associates backup metadata with modified backup data may be deleted. By doing so, the compliance sensitive data portions stored in the backup metadata may be rendered useless by disassociating metadata (e.g. 142, 146) required to interpret the meaning of the contents of the compliance sensitive data portions. Consequently, when the linking data is removed via deletion, the stored compliance sensitive data portions may be logically inaccessible because the metadata required for utilization of the compliance sensitive data portions has been logically lost though still present in storage as part of modified backup data. The compliance sensitive metadata portions and/or corresponding metadata may be removed at later points in time via garbage collection or other methods that do not place computational loads on the backup storage when the computing resource availability state of the backup storage is low. Rather, the garbage collection may only be performed when the computing resource availability state of the backup storage is high. Consequently, the actual compliance sensitive data portions and/or corresponding metadata may be preferentially removed at points in time that are unlikely to negatively impact the functionality of the backup storage while still enabling the backup storage to comply with jurisdictional requirements.

While the example storage of the backup storage (120) has been illustrated as including data structures including a limited amount of specific information, any of the data structures stored in the example storage of the backup storage (120) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

As discussed above, the system of FIG. 1.1 may comply with jurisdictional requirements by servicing compliance requests in a manner that does not impact the ability of the system of FIG. 1.1 to provide its functionalities. FIGS. 2-4 show methods that may be performed by components of the system of FIG. 1.1 to service compliance requests.

FIG. 2 shows a flowchart of a method in accordance with one or more embodiments of the invention. The method depicted in FIG. 2 may be used to service a compliance request in accordance with one or more embodiments of the invention. The method shown in FIG. 2 may be performed by, for example, a backup manager and/or a backup storage (e.g., 100, 110, FIG. 1.1). Other components of the system in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a compliance request for data is obtained. The data may be any type and quantity of data associated with a jurisdictional requirements. For example, the data may be personal data such as, for example, the name of a client.

The compliance request may be obtained from any entity. For example, the client may operate a personal electronic device to send a message including the compliance request.

In step 202, it is determined whether the data is stored in backup storage. For example, the data may be compared to compliance sensitive data portions stored in backup metadata to determine whether the data is stored in the backup storage.

If the data is not stored in the backup storage, the method may end following step 202. If the data is stored in the backup storage, the method may proceed to step 204.

In step 204, linking data associated with the data is deleted. As discussed above, backup metadata may include compliance sensitive data portions that are associated with corresponding linking data. The associations specified by the backup metadata may be utilized to identifying the linking data associated with the data. In other words, the data may be matched to one or more compliance sensitive data portions which are associated via backup metadata with corresponding linking data. The corresponding linking data may be deleted or otherwise rendered inaccessible.

After step 204, the backup storage may have met jurisdictional requirements regarding data storage. As discussed above, once linking data is removed the corresponding compliance sensitive data portions may be rendered uninterpretable. Consequently, deleting the linking data associated with the data may result in the logical deletion of the compliance sensitive data portions that may include all, or a portion, of the data for which the compliance request was sent.

In step 206, the modified backup data associated with the data is removed using garbage collection. In other words, the modified backup data that includes metadata that may be utilized to interpret the compliance sensitive data portions in backup metadata may be removed by a garbage collection process. As discussed above, the garbage collection process may be performed at any point in time after the linking data is deleted in step 204.

In one or more embodiments of the invention, the modified backup data may be removed using garbage collection by marking the modified backup data for garbage collection purposes. For example, a flag or simply removing of the linking data may serve as a flag for indicating that the modified backup data is subject to total and/or partial deletion.

For example, the modified backup data may be subject to only partial deletion.

Being subject to partial deletion may include removal of any data of the modified backup data that may be used to interpret the corresponding compliance sensitive data portions stored in the backup metadata. For example, portions of the modified backup data that specify information regarding references which were added to the modified backup data may be removed. Consequently, a portion of the modified backup data may remain in backup storage after being subject to partial deletion.

The method may end following step 206.

Removal of all, or a portion, of modified backup data may be computationally expensive process. For example, to store the modified backup data in a computationally efficient manner, the backup storage may deduplicate and/or encrypt all, or a portion, of the modified backup data. Consequently, the computational cost for deleting any portion of the modified backup data may be high due to the complex algorithms required to identify whether any portion of the deduplicated modified backup data may need to be saved to enable other data structures to be regenerated.

For example, when data, such as modified backup data, is deduplicated any data that is duplicative of other previously stored data may not be stored. Rather, a data structure that includes instructions for regenerating the deduplicated data may be stored. The data structure may include, for example, references to multiple portions of previously stored data that when combined in a specific order results in the generation of the deduplicated data. However, any number of such data structures may reference the same portion of previously stored data.

Consequently, when data stored in a deduplicated manner is to be deleted, a computational expensive process must be performed to identify whether any other data structures (that may be used to regenerate previously stored data) need access to the portions of previously stored data (that can be used to regenerate the to-be-deleted data). If any other data structure requires access to the portions of previously stored data, the portions of previously stored data are not deleted. Rather, only the data structure that may be used to regenerate the previously stored data is modified so that the previously stored data cannot be regenerated.

Thus, to make such determinations when deleting data, garbage collection processes may be employed to perform such analysis and make corresponding deletion/modifications during times when the computational resource availability of the backup storage is high to avoid impairing the ability of the backup storage to provide its other functionalities.

Accordingly, via the method illustrated in FIG. 2, garbage collection processes may be employed for actual deletion of compliance sensitive data portions while enabling the storage to comply with jurisdictional requirements immediately by simply removing linking data which may not be stored in a deduplicated state (e.g., may be very small in size so deduplication may provide little to no benefit for storage resource utilization purposes).

Throughout the method illustrated in FIG. 2 (and FIGS. 3 and 4, below), the backup manager (100, FIG. 1.1) may send messages to the agent (106, FIG. 1.1) and/or backup storage (110, FIG. 1.1) to cause the method illustrated in FIG. 2 to be performed. The backup manager (100, FIG. 1.1) may cause backups to be generated based on protection policies or other information that specifies when backups for entities should be generated to meet data integrity requirements.

As discussed with respect to FIG. 2, embodiments of the invention may provide a method for complying with jurisdictional requirements in a computationally efficient manner. To do so, a system in accordance with embodiments of the invention may store data in a predetermined manner. FIGS. 2 and 3 show diagrams of methods of storing data in a predetermined manner and providing data using data stored in a predetermined manner, respectively, in accordance with one or more embodiments of the invention.

Turning to FIG. 3, FIG. 3 shows a flowchart of a method in accordance with one or more embodiments of the invention. The method depicted in FIG. 3 may be used to store data in accordance with one or more embodiments of the invention. The method shown in FIG. 3 may be performed by, for example, a backup manager or a backup storage (e.g., 100, 110, FIG. 1.1). Other components of the system in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a backup is obtained. The backup may be obtained from, for example, a client. The client may send the backup to the backup storage for storage.

In step 302, compliance sensitive data portions of backup data of the backup are replaced with references to obtain modified backup data.

In one or more embodiments of the invention, the compliance sensitive data portions of the backup data are identified via data mining. For example, patterns or other contextual information (e.g., metadata portions) of the backup data may be used to identify the compliance sensitive data portions. Performing the identification may include matching types of metadata to types of information that are likely to include compliance sensitive data. The types of information may be set by, for example, an administrator.

Once identified, the compliance sensitive data portions may be deleted and replaced with corresponding references. A reference may be an identifier that does not enable the contents of the replaced portion to be identified. For example, a reference may be the string "Reference 1". The references may be other types of data structure that uniquely identify the portion of the backup data that has been replaced by the reference.

Replacing the compliance sensitive data portions with reference may result in generation of the modified backup data.

After replacing the compliance sensitive data portions, the resulting modified backup data may include metadata that may be used to interpret the contents of the compliance sensitive data portions. However, because the compliance sensitive data portions have been removed, the contents of the compliance sensitive data portions may not be accessed using only the modified backup data.

In step 304, linking data is obtained using the references. The linking data may be obtained by generating linking data or modifying existing linking data.

The obtained linking data may be similar to that illustrated in FIG. 1.6. For example, the linking data may include a copy of one or more references added to corresponding modified backup data and identifiers of the corresponding modified backup data. Thus, the linking data may associate the reference with the corresponding modified backup data that includes a copy of the reference.

In step 306, backup metadata is obtained using the linking data and/or the compliance sensitive data portions. The backup metadata may be obtained by generating or updating the backup metadata.

The obtained backup metadata may be similar to that illustrated in FIG. 1.5. For example, the backup metadata may include the compliance sensitive data portions and associate each of the compliance sensitive data portions with corresponding linking data.

In one or more embodiments of the invention, the backup metadata does not include metadata that describes the contents or other characteristics of the compliance sensitive data portions. By doing so, the contents of the compliance sensitive data portions may be uninterpretable using only the information included in the backup metadata.

The method may end following step 306.

By performing the method illustrated in FIG. 3, embodiments of the invention may provide a method for storing data that separates compliance sensitive data portions from other data portions. The system may link, via linking data, the removed compliance sensitive data portions to the other portions of the data that enable the data to be regenerated in the future. However, deletion of the linking data may result in the compliance sensitive data portions from being accessed by virtue of disassociating the metadata required to interpret (e.g., read) the contents of the compliance sensitive data portions. Consequently, deletion of the linking data may logically delete (e.g., prevent future access) the compliance sensitive data portions.

Turning to FIG. 4, FIG. 4 shows a flowchart of a method in accordance with one or more embodiments of the invention. The method depicted in FIG. 4 may be used to provide stored data in accordance with one or more embodiments of the invention. The method shown in FIG. 4 may be performed by, for example, a backup manager or a backup storage (e.g., 100, 110, FIG. 1.1). Other components of the system in FIG. 1.1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a request for a backup that includes compliance sensitive data is obtained. The request may be obtained by receiving the request in a message. For example, a backup manager or another entity may send the request.

In step 402, it is determined whether linking data associated with the backup is available. As discussed above, a backup may include linking data that enables backup data to be regenerated (e.g., obtained) using backup metadata and modified backup data.

The determination may be made by identifying whether any linking data is associated with the modified backup data of the backup. If no linking data is associated with the modified backup data of the backup, it is determined that the linking data is not available.

If the linking data is unavailable, the method may proceed to step 412. If the linking data is available, the method may proceed to step 404.

In step 404, modified backup data that includes references is obtained. As discussed with respect to FIGS. 1.2 and 3, a backup may include the modified backup data when the backup includes compliance sensitive information.

In step 406, compliance sensitive data portions associated with the references are obtained using the linking data. As discussed above, backup metadata of the backup may include the compliance sensitive data portions. The compliance sensitive data portions associated with the references may be obtained by reading them from the backup metadata. The linking data may associate the compliance sensitive data portions with the references, as discussed with respect to FIG. 1.6.

In step 408, the backup data is reconstructed using the compliance sensitive data portions, the linking data, and the modified backup data.

In one or more embodiments of the invention, the backup data is reconstructed by replacing the references in the modified backup data with corresponding portions of the compliance sensitive data portions. The linking data may specify which compliance sensitive data portion is used to replace which of the references included in the modified backup data.

In step 410, the request is serviced using the reconstructed backup data.

In one or more embodiments of the invention, the request is serviced by providing all, or a portion, of the reconstructed backup in response to the request.

In one or more embodiments of the invention, the request is serviced by restoring an entity using all, or a portion, of the reconstructed backup in response to the request. Restoring the entity may enable the entity to provide access to all, or a portion, of the contents of the backup data.

The method may end following step 410.

Returning to step 402, the method may proceed to step 412 following step 402 when it is determined that the linking data is not available.

In step 412, the request is serviced by indicating that the backup is unavailable.

For example, the requesting entity may be notified that the backup cannot be reconstructed. Notifying the requesting entity that the backup cannot be reconstructed may prevent dissemination of the compliance sensitive data portions.

In one or more embodiments of the invention, the request is serviced by providing the modified backup data in response to the request. Providing the modified backup data may prevent dissemination of the compliance sensitive data portions.

The method may end following step 412.

By utilizing the method illustrated in FIG. 4, a system in accordance with embodiments of the invention may comply with jurisdictional data requirements. The system may do so by preventing the dissemination of compliance sensitive data for which compliance requests have been previously received.

To further clarify embodiments of the invention, a non-limiting example is provided in FIGS. 5.1-5.4. FIG. 5.1 may illustrate a system similar to that illustrated in FIG. 1.1. FIGS. 5.2-5.4 may illustrate interactions between components and/or actions performed by the components of the system of FIG. 5.1 over time. For the sake of brevity, only a limited number of components of the system of FIG. 1.1 are illustrated in each of FIGS. 5.1-5.4.

Example

Consider a scenario as illustrated in FIG. 5.1 in which a backup manager (500) is providing backup services to a client (502). When providing backup services, the backup manager (500) may orchestrate storage of backups in a backup storage (504).

The client (502) may be providing services to a customer. When providing services to the customer, the customer may provide personal information including the name of the customer to the client (502). To provide services to the customer, the client (502) may store the name of the customer.

The backup storage (504) resides in Europe. Consequently, the backup storage (504) is subject to the GDPR. Accordingly, the customer (not shown) may request that information regarding the customer including the customer's name be deleted at any time.

Turning to FIGS. 5.2-5.4, the aforementioned figures illustrate interactions and actions between components of the system of FIG. 5.1. In these figures, the relative occurrence in time of the interactions progresses from the top of each figure (i.e., earlier in time) to the bottom of each figure (i.e., later in time). FIG. 5.4 is a continuation of the diagram of FIG. 5.3. FIG. 5.3 is a continuation of the diagram of FIG. 5.2. In other words, element 510 indicates the first interaction that occurs in time while element 546 indicates the last interaction that occurs.

At a first point in time as illustrated in FIG. 5.2, the client (502) stores the customer name (510) in storage, as discussed above, to provide services to the client.

After the client (502) stores the customer name (510), the backup manager (500) initiates backup generation (512) of the client (502). In response to the initiation of the backup generation (512), the client (502), generates a backup including the customer name (514). The client (502) provides the backup (516) to the backup storage (504).

After receiving the backup (516), the backup storage (504) generates modified backup data, linking data, and backup metadata using the backup (518). Specifically, the backup storage (504) identifies that the customer name included in the backup (516) is compliance sensitive data and replaces the corresponding portions of the backup data with a reference thereby generating the modified backup data.

To generate the linking data, the backup storage (504) generates a data structure and adds a copy of the reference and an association between the modified backup data and the reference. To generate the backup metadata, the backup storage (504) may generate a data structure that includes the customer name, that does not include metadata with respect to the customer name, and that includes an association between the customer name and the linking data.

After generating the aforementioned data structures and storing them as a backup, time passes as indicated by the breaks in the vertical lines. After a period of time passes, a client failure (520) occurs due to a hardware failure of the computing device hosting the client (502). After the client failure (520) occurs, the client is rendered unable to provide services as indicated by the dashed vertical line descending from the client (502) in FIGS. 5.2 and 5.3.

Turning to FIG. 5.3, after the client fails, the backup manager (500) detects the failure of the client (502) an initiates a client restoration (522) by sending a restoration request message to the backup storage (504) requesting that the previously generated backup of the client (502) be used to restore the client. In response to initiation of the client restoration (522), the backup storage (504) obtains the backup using the modified backup data, the linking data, and the backup metadata (524).

Specifically, the backup storage (504) reconstructs the backup data by replacing the references in the modified backup data with the customer name as specified by the linking data. After obtaining the backup metadata, the backup storage (504) provides the backup data (526) to the computing device that hosts the failed instance of the client (502). Using the backup data (526), an agent hosted by the computing device performs a restoration using the backup data (528) to restore the client (502). As seen in FIG. 5.3, the vertical line is shown as solid after performing the restoration using the backup data (528) (i.e., below the box marked as 528).

After the client (502) is restored, the client (502) continues to provide computer implemented services for a second period of time as indicated by the break in the vertical lines in FIG. 5.3.

After the second period of time, the customer elects to no longer allow the client (502) or other entities to retain its personal information and sends out corresponding compliance requests. Consequently, the backup storage (504) obtains a compliance request for the customer (530) based on the compliance requests sent out by the customer.

Because the backup storage (504) resides in Europe, the customer name must be deleted to comply with the requirements of the GDPR.

In response to receiving the compliance request from the customer, the backup storage (504) deletes the linking data (532). By doing so, the backup storage (504) is now in compliance with the GDPR because the customer name has been logically deleted at minimal computational cost. However, the bit sequences corresponding to the customer name may still be present in storage of the backup storage (504). The customer name may be subsequently removed at a later point in time by performance of garbage collection by the backup storage (504). By doing so, the logical deletion of the customer's name may occur at any point in time and at minimal computational cost while the actual deletion of the bit sequences corresponding to the client's name may be performed at a later time when the backup storage (504) is in a high computing resource availability state.

Turning to FIG. 5.4, after the customer name is logically deleted, a second client failure (534) occurs (again, as illustrated by the dashed vertical line). After the client failure (534) occurs, the backup manager (500) again initiates a client restoration (536) by sending a message to the backup storage (504) to request that the backup of the client (502) be used to restore the client.

In response to the initiation of the client restoration (536), the backup storage (504) determines that the linking data is unavailable (538). Consequently, the backup storage (504) provides the modified backup data (540) in response to the request. Because the modified backup data (540) does not include the customer name (only metadata used to interpret the data corresponding to the client name that has been removed from the modified backup data and replaced with a reference), the computing device hosting the failed instance of the client performs a partial restoration using the modified backup data (542). In other words, the client (502) is restored but lacks the customer name in its data.

Consequently, when the client (502) obtains a request for the customer name (544), the client (502) responds by indicating that the customer name is unavailable (546). Accordingly, the backup storage (504) and the client (502) have both complied with the GDPR by eliminating the customer name from their respective storages.

End of Example

Thus, as illustrated in FIGS. 5.1-5.4, embodiments of the invention may provide a method complying with jurisdictional requirements in a manner that is less likely to impact the ability of the system to provide its other functionalities while complying with the jurisdictional requirements. For example, the system was able to comply with the requirements by logically deleting data while purging the corresponding bit sequences at a later point in time during which the system was unlikely to be impacted by the computational load required for purging of the corresponding bit sequences.

Figure 6:
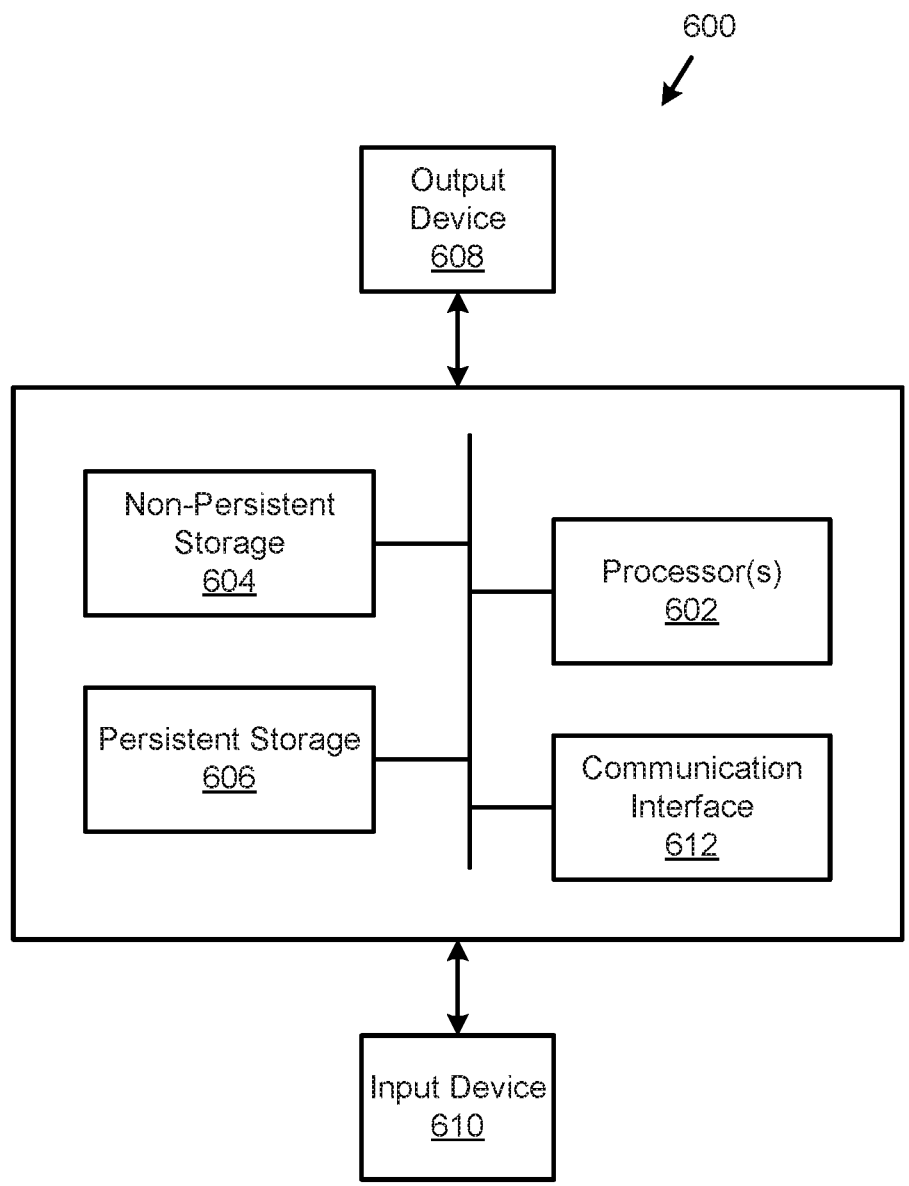
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for providing backup services in a manner that enables a system to comply with jurisdictional requirements without compromising other services provided by the system. To do so, embodiments of the invention may provide a system that stores data subject to jurisdictional requirements (e.g., compliance sensitive data) separately from other data that is not subject to jurisdictional requirements including metadata used to describe or otherwise interpret the contents of the data subject to jurisdictional requirements. The separately stored data and metadata may be associated with each other via linking data that may be deleted in a computationally efficient manner (e.g., not deduplicated and/or encrypted). To comply with jurisdictional requirements, the system may logically delete the subject data by deleting the linking data. By doing so, the data subject to the jurisdictional requirements may be rendered (i) inaccessible and/or (ii) uninterpretable.

The system may, at a point in time during which the system is in a high computing resource availability state, physically delete (e.g., modify storage mediums) the bit sequences corresponding to the data subject to jurisdictional requirements and/or corresponding metadata via garbage collection or other means. By doing so, a system in accordance with embodiments of the invention may facilitate immediate compliance with jurisdictional data requirements while shifting, in time, the computational cost for actually deleting bit sequences corresponding to data subject to jurisdictional data requirements.

Thus, embodiments of the invention may address the problem of limited computational resource availability for providing backup services in a distributed environment. To address the limited computational resources, the system may time shift performance of high computing resource tasks to later periods of time while immediately complying with jurisdictional data regulations.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A backup storage for providing backup services, comprising:
    storage for storing backups; and
    a compliance manager programmed to:
        obtain a compliance request for data;
        make a determination, in response to obtaining the compliance request, that the data is stored as part of a backup of the backups;
        in response to making the determination:
            delete linking data that associates a portion of compliance sensitive data portion stored in backup metadata of the backup with a portion of modified backup data of the backup to make the linking data unavailable; and
            remove the modified backup data using garbage collection.

2. The backup storage of claim 1, wherein the compliance manager is further programmed to:
    prior to obtaining the compliance request:
        obtain the backup data;
        replace a copy of the compliance sensitive data portion that is part of the backup data with a reference to obtain the modified backup data, wherein the reference is the portion of the modified backup data;
        obtain the linking data using the reference; and
        obtain the backup metadata using, at least in part, the linking data and the compliance sensitive data portion.

3. The backup storage of claim 1, wherein the compliance manager is further programmed to:
    obtain a request for the backup data;
    in response to obtaining the request for the backup data, make a second determination that the linking data is unavailable;
    in response to making the second determination:
        service the request for the backup data by indicating that the backup data is unavailable.

4. The backup storage of claim 1, wherein the compliance manager is further programmed to:
    prior to deleting the linking data:
        obtain a request for the backup data;
        in response to obtaining the request for the backup data, make a second determination that the linking data is available;
        in response to making the second determination:
            replace, using the linking data, a reference included in the modified backup data with the compliance sensitive data portion in the backup metadata to obtain reconstructed backup data; and
            service the request for the backup data by providing the reconstructed backup data.

5. The backup storage of claim 1, wherein the compliance sensitive data portion comprises personal information.

6. The backup storage of claim 1, wherein the backup metadata and the modified backup data are stored in different geographic regions.

7. The backup storage of claim 1, wherein the modified backup data is removed using garbage collection during a period of high computing resource availability of the backup storage, wherein the linking data is deleted during a second period of low computing resource availability of the backup storage.

8. The backup storage of claim 1, wherein the backup metadata does not describe the contents of the compliance sensitive data portion.

9. The backup storage of claim 8, wherein the modified backup data describes the contents of the compliance sensitive data portion.

10. The backup storage of claim 9, wherein the contents of the linking data includes a reference that associates a description of the contents of the compliance sensitive data portion stored in the modified backup data with the compliance sensitive data portion stored in the backup metadata.

11. A method for providing backup services, comprising:
    obtaining a compliance request for data;
    making a determination, in response to obtaining the compliance request, that the data is stored as part of a backup;
    in response to making the determination:
        deleting linking data that associates a portion of compliance sensitive data portion stored in backup metadata of the backup with a portion of modified backup data of the backup to make the linking data unavailable; and
        removing the modified backup data using garbage collection.

12. The method of claim 11, further comprising:
    prior to obtaining the compliance request:
        obtaining the backup data;
        replacing a copy of the compliance sensitive data portion that is part of the backup data with a reference to obtain the modified backup data, wherein the reference is the portion of the modified backup data;
        obtaining the linking data using the reference; and
        obtaining the backup metadata using, at least in part, the linking data and the compliance sensitive data portion.

13. The method of claim 11, further comprising:
    obtaining a request for the backup data;
    in response to obtaining the request for the backup data, make a second determination that the linking data is unavailable;
    in response to making the second determination:
        servicing the request for the backup data by indicating that the backup data is unavailable.

14. The method of claim 11, further comprising:
    prior to deleting the linking data:
        obtaining a request for the backup data;
        in response to obtaining the request for the backup data, making a second determination that the linking data is available;
        in response to making the second determination:
            replacing, using the linking data, a reference included in the modified backup data with the compliance sensitive data portion in the backup metadata to obtain reconstructed backup data; and servicing the request for the backup data by providing the reconstructed backup data.

15. The method of claim 11, wherein the compliance sensitive data portion comprises personal information.

16. A non-transitory computer readable medium comprising computer readable program code, which when executed by a computer processor enables the computer processor to perform a method for providing backup services, the method comprising:
obtaining a compliance request for data;
making a determination, in response to obtaining the compliance request, that the data is stored as part of a backup;
in response to making the determination:
deleting linking data that associates a portion of compliance sensitive data portion stored in backup metadata of the backup with a portion of modified backup data of the backup to make the linking data unavailable; and
removing the modified backup data using garbage collection.

17. The non-transitory computer readable medium of claim 16, wherein the method further comprises:
prior to obtaining the compliance request:
obtaining the backup data;
replacing a copy of the compliance sensitive data portion that is part of the backup data with a reference to obtain the modified backup data, wherein the reference is the portion of the modified backup data;
obtaining the linking data using the reference; and
obtaining the backup metadata using, at least in part, the linking data and the compliance sensitive data portion.

18. The non-transitory computer readable medium of claim 16, wherein the method further comprises:
obtaining a request for the backup data;
in response to obtaining the request for the backup data, make a second determination that the linking data is unavailable;
in response to making the second determination:
servicing the request for the backup data by indicating that the backup data is unavailable.

19. The non-transitory computer readable medium of claim 16, wherein the method further comprises:
prior to deleting the linking data:
obtaining a request for the backup data;
in response to obtaining the request for the backup data, making a second determination that the linking data is available;
in response to making the second determination:
replacing, using the linking data, a reference included in the modified backup data with the compliance sensitive data portion in the backup metadata to obtain reconstructed backup data; and
servicing the request for the backup data by providing the reconstructed backup data.

20. The non-transitory computer readable medium of claim 16, wherein the compliance sensitive data portion comprises personal information.

* * * * *